Oct. 25, 1966　　R. R. FRANK ETAL　　3,280,844
CAM-CONTROLLED VALVE STRUCTURE
Filed Aug. 13, 1964　　　　　　　　　　　　2 Sheets-Sheet 1
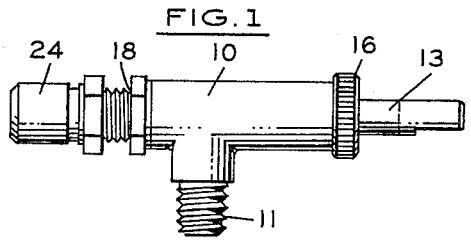
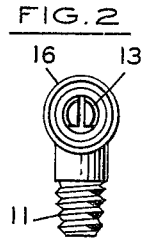
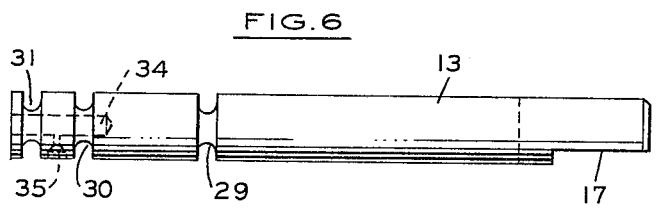
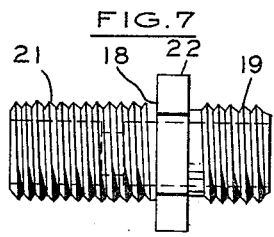
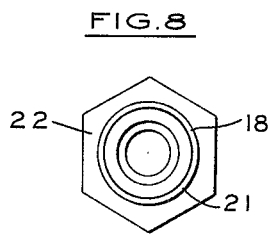
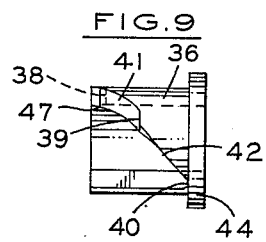
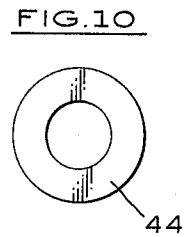
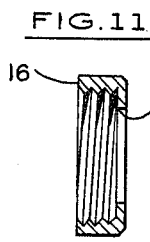
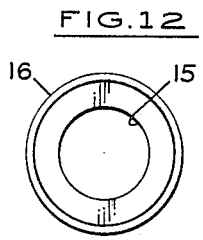
INVENTORS
ROBERT R. FRANK
GORDON E. PORTER
BY
Whittemore, Hulbert & Belknap
ATTORNEYS

United States Patent Office 3,280,844
Patented Oct. 25, 1966

3,280,844
CAM-CONTROLLED VALVE STRUCTURE
Robert R. Frank, Paoli, and Gordon E. Porter, Mitchell, Ind., assignors to The Roberts Brass Manufacturing Co., Mitchell, Ind., a corporation of Michigan
Filed Aug. 13, 1964, Ser. No. 389,426
11 Claims. (Cl. 137—625.38)

This invention relates generally to gas valves, and refers more particularly to cam-controlled valve structures for gas burners.

One of the essential objects of the invention is to provide a gas valve having an elongated body that is provided adjacent its inner end with a laterally projecting gas inlet; that is provided at its inner end with a longitudinally extending gas outlet; and that contains a longitudinally extending rotatable and longitudinally movable plunger normally crossing the gas inlet and disposed in alignment with the gas outlet.

Another object is to provide a gas valve wherein the elongated body is provided with a longitudinally extending bore for the plunger, and wherein a tubular adaptor is mounted in the gas outlet and has a longitudinally extending bore that is equal in diameter to and is in alignment with the bore in the body and that normally receives the inner end portion of the plunger.

Another object is to provide a gas valve wherein the plunger carries three longitudinally spaced resilient O-rings, one being within and having sealing engagement with the bore in the body, and the other two normally being within and having sealing engagement with the bore in the tubular adaptor but movable rearwardly with the plunger from the adaptor during rearward longitudinal movement of the plunger.

Another object is to provide a gas valve wherein the plunger is provided at its inner end with an axially extending bore that opens into the adaptor and is provided between the two O-rings normally within the adaptor with a radially extending restricted or metering inlet passage that extends from the periphery of the plunger to the axially extending bore and that is adapted, when the plunger moves rearwardly, to communicate with the gas inlet, whereby a limited quantity of gas can flow from said gas inlet through said restricted inlet passage in the plunger and through the axially extending bore in the plunger into the adaptor, and thence to a restricted outlet orifice in the outer end of a hood on the adaptor.

Another object is to provide a gas valve wherein an annular cam mounted within an annular chamber at the outer end of the body surrounds the rotatable plunger and is provided at its forward edge with three circumferentially spaced shoulders or arrest portions and two sloping portions arranged alternately in series so that they are engageable successively by a pin projecting laterally from said plunger for controlling the rotation and longitudinal movement of the plunger and O-rings thereon from (1) a fully closed position, and (2) a partially open position, to (3) a fully open position relative to the gas inlet.

Another object is to provide a gas valve wherein the cam is provided at the outer end of the elongated body with a laterally projecting annular flange that is held firmly against the outer end of the elongated body by a cup-shaped cap threadedly engaging the exterior of said elongated body.

Another object is to provide a gas valve wherein a coil spring extending longitudinally of the bore in the tubular adaptor between an internal annular flange at the inner end of said bore and the inner end of the plunger constantly urges the plunger rearwardly, whereby the pin will be normally maintained in proper operative engagement with the respective shoulders and sloping portions of the cam while the plunger is rotated.

Another object is to provide a gas valve wherein the pin is normally locked behind a projection of one end of one of the sloping portions of the cam by the action of the spring when such pin engages one of the shoulders or arrest portions of the cam in the fully closed position, whereby the plunger is prevented from rotating until it is initially pressed inwardly against the tension of said spring to enable the pin to clear such projection.

Another object is to provide a gas valve that is simple in construction, economical to manufacture, and efficient in operation.

Other objects, advantages and novel details of construction of this invention will be made more apparent as this description proceeds, especially when considered in connection with the accompanying drawings wherein:

FIGURE 1 is an elevational view of a gas valve embodying our invention.

FIGURE 2 is an end view of the gas valve illustrated in FIGURE 1.

FIGURE 6 is an elevational view of the plunger.

FIGURE 7 is an elevational view of the adaptor.

FIGURE 8 is an end view of the adaptor shown in FIGURE 7.

FIGURE 9 is a detailed elevational view of the cam.

FIGURE 10 is an outer end view of the cam shown in FIGURE 9.

FIGURE 11 is a vertical sectional view through the cap.

FIGURE 12 is an inside end view of the cap.

Figure 3:
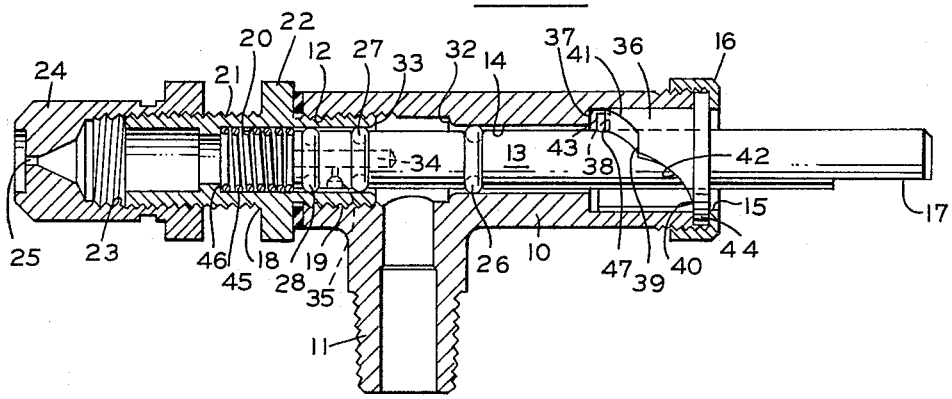
FIGURE 3 is an enlarged vertical longitudinal sectional view through the gas valve shown in FIGURE 1, when the valve is fully closed.

Referring now to the drawings, 10 is an elongated valve body having adjacent the inner end thereof an exteriorly threaded laterally projecting tubular gas inlet 11 adapted to be connected to a gas manifold (not shown), and having an interiorly threaded longitudinally extending gas outlet 12 opening outwardly through the valve body 10 at the inner end thereof.

13 is a longitudinally extending rotatable and longitudinally movable plunger within a longitudinally extending bore 14 in the valve body and normally crossing the gas inlet 11. Preferably this plunger 13 extends outwardly through a central opening 15 in a cup-shaped cap 16 threadedly engaging the exterior of said elongated body, and is provided at its outer end with a proper seat 17 for a suitable handle (not shown). The bore 14 is in communication with the gas inlet 11, and is in alignment with the gas outlet 12.

18 is a tubular adaptor having an exteriorly threaded portion 19 at its inner end threadedly engaging the interiorly threaded gas outlet 12 of the valve body 10 and having a longitudinally extending bore 20 equal in diameter to and in alignment with the bore 14 in the valve body 10. Such bore 20 normally receives the inner end portion of the plunger 13. The adaptor 18 also has an exteriorly threaded portion 21 at its outer end, and is provided between the exteriorly threaded portions 19 and 21 with a hexagonal body 22 by which it may be adjusted relative to the valve body 10.

Threadedly engaging the exteriorly threaded portion 21 of the adaptor 18 is an interiorly threaded cylindrical portion 23 of a hood 24 having in its outer end a restricted outlet orifice 25 that is adapted to discharge gas within a venturi (not shown) of a gas burner (not shown).

26, 27 and 28 respectively are three resilient O-rings formed of neoprene or the like engaging circumferentially extending grooves 29, 30 and 31 respectively in the plunger 13 at longitudinally spaced points thereof adjacent its inner end. As shown, the outside diameter of each of said O-rings 26, 27 and 28 respectively is substantially equal to the inside diameter of the bores 14 and 20 respectively in the body 10 and in the adaptor 18, so that such O-rings form effective seals with said bores 14 and 20 to prevent the escape of gas from said gas inlet 11. As shown, the O-ring 26 is within the bore 14 in the body 10, while the O-rings 27 and 28 respectively are normally within the bore 20 in the tubular adaptor 18, but are movable rearwardly with the plunger 13 from the adaptor 18 during rearward longitudinal movement of the plunger 13, Preferably the opposed inner ends 32 and 33 respectively of the bores 14 and 20 in said body 10 and in said adaptor 18 are curved or rounded to permit the O-rings 27 and 28 respectively to slide with the plunger 13 without being cut, sheared or otherwise damaged.

In the present construction, the plunger 13 is provided at its inner end with an axially extending bore 34 that opens into the adaptor 18, and is provided between the two O-rings 27 and 28 normally within the adaptor 18 with a radially extending restricted or metering inlet passage 35 that extends from the periphery of the plunger 13 to the axially extending bore 34 and that is adapted, when the plunger 13 moves rearwardly, to communicate with the gas inlet 11, whereby a limited quantity of gas can flow from said gas inlet through said restricted inlet passage 35 in the plunger and through the axially extending bore 34 in the plunger into the adaptor 18 and thence to the restricted outlet orifice 25 in the outer end of the hood 24 on the adaptor 18.

36 is an annular cam mounted within an annular chamber 37 at the outer end of the body 10 and surrounding the rotatable plunger 13. Preferably the cam 36 is provided at its forward edge with three circumferentially spaced shoulders or arrest portions 38, 39 and 40 respectively, and two sloping portions 41 and 42 respectively arranged alternately in series, so that such shoulders or arrest portions 38, 39 and 40 respectively and sloping portions 41 and 42 respectively are engageable succesively by a pin 43 projecting laterally from said plunger 13 for controlling the rotation and longitudinal movement of the plunger 13 and O-rings 26, 27 and 28 respectively thereon from (1) a fully closed position, to (2) a partially open position, to (3) a fully open position relative to the gas inlet 11.

Preferably the cam 36 is provided at the outer end of the elongated body 10 with a laterally projecting annular flange 44 that is held firmly against the outer end of the body 10 by the cup-shaped cap 16 threadedly engaging the exterior of said body 10.

45 is a coil spring extending longitudinally of the bore 20 in the tubular adaptor 18 between an internal annular flange 46 at the inner end of said bore and the inner end of the plunger 13 and constantly urging the plunger 13 rearwardly, whereby the pin 43 will be normally maintained in proper operative engagement with the respective shoulders or arrest portions 38, 39 and 40 respectively, and sloping portions 41 and 42 respectively of the cam 36 while the plunger 13 is rotated.

As shown, the pin 43 on the plunger 13 is locked behind a projection 47 of one end of the sloping portion 41 of the cam 36 by the pressure exerted by the spring 45 upon the plunger 13 when such pin 43 engages the shoulder or arrest portion 38 in the fully closed position, whereby the plunger 13 is prevented from rotating until it is pressed inwardly against the tension of said spring 45 to enable the pin 43 to clear such projection 47.

In use, the pin 43 on the plunger 13 normally engages the shoulder or arrest portion 38 of the cam 36 and is held in locked position behind the projection 47 of the sloping portion 41 of the cam 36 by the pressure exerted by the spring 45 upon the plunger 13. Thus, the plunger 13 cannot rotate until the pin 43 is cleared from said projection 47. Also, as a result of the engagement of the pin 43 on the plunger 13 with the shoulder or arrest portion 38 of the cam 36, the plunger 13 is normally held by the spring 45 within the bore 20 in the adaptor 18 and across the gas inlet 11. The O-rings 26, 27 and 28 respectively are also normally in sealing engagement with the bores 14 and 20 respectively in the body 10 and in the adaptor 18. Thus, the valve is closed, so that no gas can escape from the gas inlet 11 through the adaptor 18 to the restricted outlet orifice 25 in the hood 24 on the adaptor or through the bore 14 in the body 10 for the plunger 13 and past the cam 36.

Figure 4:
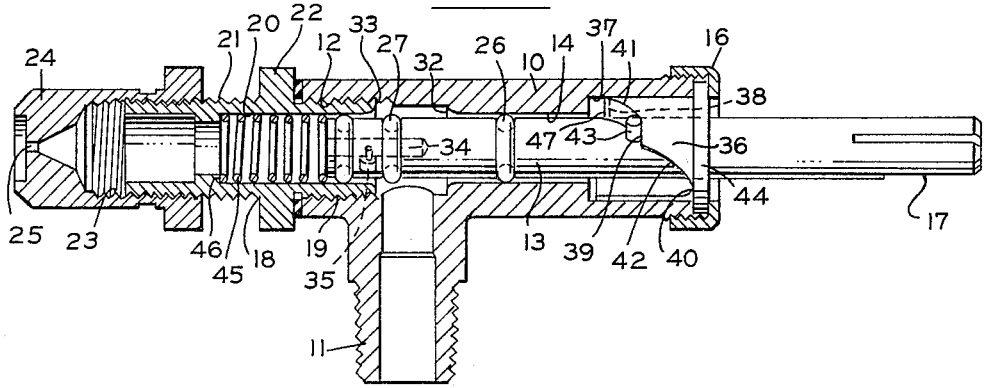
FIGURE 4 is a view similar to FIGURE 3, but showing the valve in partially open position.

When it is desired to partially open the valve so that a limited quantity of gas can flow from said gas inlet 11 through the restricted or metering inlet passage 35 in the plunger 13 and through the axially extending bore 34 in the plunger into the adaptor 18, and thence to the restricted outlet orifice 25 in the outer end of the hood 24 on the adaptor, the plunger 13 is initially pressed inwardly against the tension of the spring 45 to enable the pin 43 to clear the projection 47, and then is rotated anticlockwise to cause the pin 43 to travel along the sloping portion 41 of the cam 36 to the intermediate shoulder or arrest portion 39 thereof. This causes the plunger 13 and O-rings 26, 27 and 28 respectively to move rearwardly from the initial position illustrated in FIGURE 3 to the intermediate position illustrated in FIGURE 4.

Figure 5:
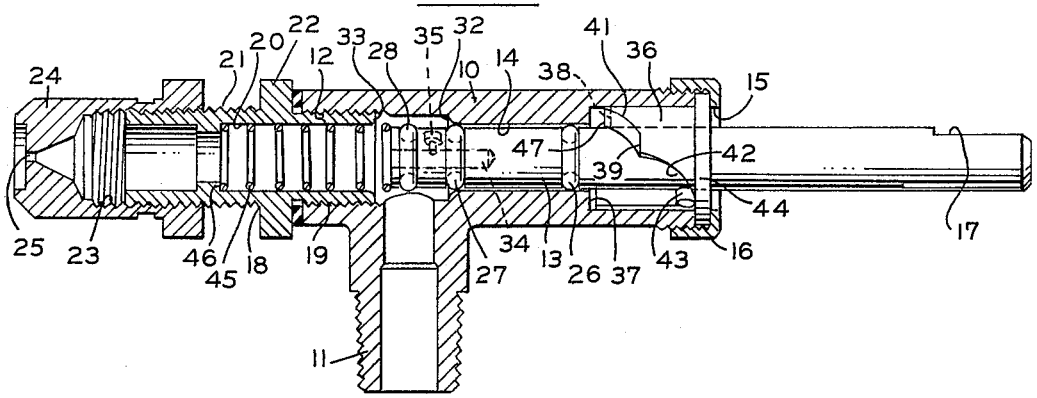
FIGURE 5 is a view similar to FIGURE 3, but showing the valve in fully open position.

When it is desired to fully open the valve from a partially open position thereof, so that gas can flow freely from the gas inlet 11 to the interior of the adaptor 18 and thence to the restricted outlet orifice 25 in the outer end of the hood 24 on the adaptor, the plunger 13 is rotated anticlockwise to cause the pin 43 to travel from the shoulder or arrest portion 39 of the cam 36 along the sloping portion 42 of the cam to the shoulder or arrest portion 40 thereof. This causes the plunger 13 and O-rings 26, 27 and 28 respectively to move rearwardly from the intermediate position illustrated in FIGURE 4 to the final position illustrated in FIGURE 5.

If desired, the plunger 13 of the valve may be moved from fully closed position to fully open position by initially pressing the plunger 13 inwardly against the tension of the spring 45 to enable the pin 43 to clear the projection 47, and then rotating the plunger 13 anticlockwise to cause the pin 43 to travel along the sloping portion 41 of the cam to the shoulder or arrest portion 39, and thence along the sloping portion 42 of the cam to the shoulder or arrest portion 40 thereof. This causes the plunger 13 and O-rings 26, 27 and 28 respectively to move rearwardly from the initial position illustrated in FIGURE 3 to the final position illustrated in FIGURE 5.

When it is desired to close the valve from a partially open position thereof, the plunger 13 is rotated clockwise to cause the pin 43 to travel from the shoulder or arrest portion 39 of the cam 36 along the sloping portion 41 and thence over the projection 47 to the shoulder or arrest portion 38 in rear of said projection 47. This causes the plunger 13 and O-rings 26, 27 and 28 respectively to move forwardly from the intermediate position illustrated in FIGURE 4 to the initial position illustrated in FIGURE 3. In this connection, the spring 45 will cause the pin 43 to engage the shoulder or arrest portion 38 with a snap action as soon as such pin clears the projection 47.

When it is desired to close the valve from a fully open position thereof, the plunger 13 is rotated clockwise to cause the pin 43 to travel from the shoulder or arrest portion 40 of the cam 36 along the sloping portion 42 to the shoulder or arrest portion 39, and thence along the sloping portion 41 and over the projection 47 to the shoulder or arrest portion 38 in rear of said projection 47. This causes the plunger 13 and O-rings 26, 27 and 28 respectively to move forwardly from the position illustrated in FIGURE 5 to the initial position illustrated in FIGURE 3. In this connection, the spring 45 will cause the pin 43 to engage the shoulder or arrest portion 38 with a snap action as soon as such pin clears the projection 47.

Thus, with our construction, either a high flame or a low flame may be obtained at the gas burner by the longitudinal movement of the plunger 13.

What we claim as our invention is:

1. A gas valve having an elongated body provided with a laterally projecting gas inlet and provided with a longitudinally extending gas outlet opening outwardly through one end thereof, said elongated body having a longitudinally extending bore in communication with said gas inlet and disposed in alignment with said gas outlet, a tubular adaptor mounted within said gas outlet and having a longitudinally extending bore equal in diameter to and in alignment with the bore in said elongated body, a rotatable and longitudinally movable plunger in said aligned bores, three O-rings carried by said plunger for forming seals with the aligned bores respectively in said elongated body and in said adaptor to prevent the escape of gas from said gas inlet, two of said O-rings normally being within said adaptor, the third of said O-rings normally being within said elongated body, said plunger being provided at its inner end with an axially extending bore opening into said adaptor and being provided between the two O-rings normally within said adaptor with a radially extending metering inlet passage extending from the periphery of said plunger to said axially extending bore, said metering inlet passage being adapted when said plunger is moved rearwardly from a fully closed position, to communicate with said gas inlet to permit a partial flow of gas to said adaptor, said plunger being movable further rearwardly to permit a full flow of gas from said gas inlet to said adaptor, a cam mounted within said elongated body at the outer end thereof and surrounding said plunger, said cam being provided at its forward edge with three circumferentially spaced shoulders and two sloping portions arranged alternately in series, means carried by said plunger and engageable successively with said shoulders and sloping portions for controlling the rotation and longitudinal movement of said plunger and O-rings thereon from (1) a fully closed position, to (2) a partially open position, to (3) a fully open position relative to said gas inlet, and means within the bore in said tubular adaptor between an abutment on said tubular adaptor and the inner end of said plunger for constantly urging the plunger rearwardly, whereby the first mentioned means will be normally maintained in proper operative engagement with the respective shoulders and sloping portions of said cam while the plunger is rotated and moved longitudinally.

2. The gas valve defined in claim 1, wherein a cup-shaped cap is secured to said elongated body at the outer end thereof and has an opening receiving said plunger, and said cam has at its outer end means held firmly by said cap.

3. The gas valve defined in claim 1, wherein a cup-shaped cap is threadedly secured to the exterior of said elongated body at the outer end thereof and has an enlarged opening receiving said plunger, and said cam has at its outer end a laterally projecting annular flange disposed between the outer end of said elongated body and said cap and held against movement by said cap.

4. The gas valve defined in claim 1, wherein the first mentioned means is a pin projecting laterally from said plunger.

5. The gas valve defined in claim 1, wherein the second mentioned means is a coil spring extending longitudinally of the bore in said tubular adaptor between an internal annular flange of said tubular adaptor and the inner end of said plunger.

6. The gas valve defined in claim 1, wherein each of the three O-rings is formed from resilient material.

7. The gas valve defined in claim 1, wherein each of the three O-rings is formed from neoprene.

8. The gas valve defined in claim 1, wherein the opposed inner ends of the bores respectively in said elongated body and in said adaptor are rounded to permit at least one of said three O-rings to slide with said plunger from sealing engagement with the bore in said adaptor to the bore in said elongated body, and vice versa without being cut, sheared or otherwise damaged.

9. The gas valve defined in claim 1, wherein one of the two sloping portions of the cam surrounding said plunger has a projection extending endwise therefrom over one of the three circumferentially spaced shoulders, and the first mentioned means is a pin projecting laterally from said plunger and is adapted during rotation of said plunger to move over and behind said projection to be locked.

10. The gas valve defined in claim 9, wherein the pin projecting from said plunger is normally held by the second mentioned means in engagement with one of the three circumferentially spaced shoulders when said pin is locked behind said projection.

11. The gas valve defined in claim 10, wherein the plunger is prevented from rotating without first being pressed inwardly against the second mentioned means to enable the pin to clear said projection.

References Cited by the Examiner

UNITED STATES PATENTS

| 2,115,383 | 4/1938 | Christensen. |
| 2,833,307 | 5/1958 | Henderson _____ 251—325 X |

FOREIGN PATENTS

| 1,105,326 | 6/1955 | France. |

M. CARY NELSON, *Primary Examiner.*

A. ROSENTHAL, *Examiner.*